(12) United States Patent
Xiao

(10) Patent No.: US 10,701,243 B2
(45) Date of Patent: Jun. 30, 2020

(54) INFORMATION PROCESSING METHOD, FIRST TERMINAL, SECOND TERMINAL, SERVER, AND SYSTEM

(71) Applicant: Tencent Technology (Shenzhen) Company Limited, Shenzhen (CN)

(72) Inventor: Siyu Xiao, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 285 days.

(21) Appl. No.: 15/952,086

(22) Filed: Apr. 12, 2018

(65) Prior Publication Data

US 2018/0234589 A1    Aug. 16, 2018

Related U.S. Application Data

(63) Continuation-in-part of application No. PCT/CN2016/109084, filed on Dec. 8, 2016.

(30) Foreign Application Priority Data

Jan. 26, 2016 (CN) .......................... 2016 1 0053468

(51) Int. Cl.
*G06F 21/00* (2013.01)
*H04N 1/44* (2006.01)
(Continued)

(52) U.S. Cl.
CPC .......... *H04N 1/4486* (2013.01); *G06F 21/10* (2013.01); *G06F 21/16* (2013.01); *G06F 21/60* (2013.01);
(Continued)

(58) Field of Classification Search
CPC ........ G06F 21/60; G06F 21/16; G06F 21/602; G06Q 50/01; H04L 51/10; H04L 51/32
See application file for complete search history.

(56) References Cited

U.S. PATENT DOCUMENTS

2002/0147661 A1  10/2002  Hatakama et al.
2004/0162782 A1   8/2004  Bible, Jr. et al.
(Continued)

FOREIGN PATENT DOCUMENTS

CN    103002030 A    3/2013
CN    104463011 A    3/2015
(Continued)

OTHER PUBLICATIONS

Tencent Technology, Written Opinion, PCT/CN2016/109084, dated Mar. 14, 2017, 8 pgs.
(Continued)

*Primary Examiner* — Beemnet W Dada
(74) *Attorney, Agent, or Firm* — Morgan, Lewis & Bockius LLP

(57) ABSTRACT

Embodiments of the present disclosure disclose an information access control method performed at a server, the method including: receiving an image sharing request from a first terminal, the image sharing request including a first image to be shared among a user group of a social networking application; encrypting the first image using an encryption key to obtain a second image; sending a preview version of the first image to a second terminal; receiving an image viewing request from the second terminal in response to a user selection of the preview version of the first image at the second terminal and a user-initiated resource transfer from the second user account to the first user account; and returning the second image and a decryption key to the second terminal, wherein the second terminal is configured
(Continued)

to restore the first image from the second image using the decryption key.

20 Claims, 19 Drawing Sheets

(51) Int. Cl.

| | | |
|---|---|---|
| *G06F 21/60* | (2013.01) | |
| *G06F 21/16* | (2013.01) | |
| *G06F 21/10* | (2013.01) | |
| *G06Q 20/38* | (2012.01) | |
| *G06Q 20/12* | (2012.01) | |
| *G06Q 30/06* | (2012.01) | |
| *G06Q 20/40* | (2012.01) | |
| *G06Q 10/10* | (2012.01) | |
| *G06Q 50/00* | (2012.01) | |
| *G06Q 20/36* | (2012.01) | |
| *H04L 9/08* | (2006.01) | |
| *H04L 12/58* | (2006.01) | |

(52) U.S. Cl.
CPC ......... *G06Q 10/10* (2013.01); *G06Q 20/1235* (2013.01); *G06Q 20/367* (2013.01); *G06Q 20/38215* (2013.01); *G06Q 20/405* (2013.01); *G06Q 30/0601* (2013.01); *G06Q 50/01* (2013.01); *H04L 9/088* (2013.01); *H04L 51/10* (2013.01); *H04L 51/32* (2013.01); *H04L 2209/60* (2013.01)

(56) References Cited

U.S. PATENT DOCUMENTS

| | | | | |
|---|---|---|---|---|
| 2014/0368601 | A1* | 12/2014 | deCharms | H04W 4/021 |
| | | | | 348/14.02 |
| 2015/0296170 | A1* | 10/2015 | Farrell | H04N 9/8227 |
| | | | | 386/254 |
| 2018/0046814 | A1* | 2/2018 | Manoharan | H04L 9/0863 |
| 2018/0241911 | A1* | 8/2018 | Yasukaga | H04N 1/4486 |
| 2018/0285573 | A1* | 10/2018 | Lantz | G09C 5/00 |
| 2018/0349049 | A1* | 12/2018 | Eapen | G06Q 20/18 |

FOREIGN PATENT DOCUMENTS

| | | |
|---|---|---|
| CN | 104901937 A | 9/2015 |
| CN | 105653909 A | 6/2016 |
| CN | 105681309 A | 6/2016 |
| JP | 2002163571 A | 6/2002 |
| JP | 2002300338 A | 10/2002 |
| JP | 2008158741 A | 7/2008 |
| JP | 2009009586 A | 1/2009 |
| KR | 20060027159 A | 3/2006 |
| KR | 20110050062 A | 5/2011 |
| KR | 20150122773 A | 11/2015 |

OTHER PUBLICATIONS

Tencent Technology, IPRP, PCT/CN2016/109084, dated Jul. 31, 2018, 9 pgs.

Tencent Technology, ISR, PCT/CN2016/109084, dated Mar. 14, 2017, 3 pgs.

* cited by examiner

INFORMATION PROCESSING METHOD, FIRST TERMINAL, SECOND TERMINAL, SERVER, AND SYSTEM

PRIORITY CLAIM AND RELATED APPLICATION

This application is a continuation-in-part application of PCT/CN2016/109084, entitled "INFORMATION PROCESSING METHOD, FIRST TERMINAL, SECOND TERMINAL, SERVER AND SYSTEM" filed on Dec. 8, 2016, which claims priority to Chinese Patent Application No. 201610053468.6, filed with the State Intellectual Property Office of the People's Republic of China on Jan. 26, 2016, and entitled "INFORMATION PROCESSING METHOD, FIRST TERMINAL, SECOND TERMINAL, SERVER AND SYSTEM", both of which are incorporated herein by reference in their entirety.

FIELD OF THE TECHNOLOGY

The present disclosure relates to communications technologies, and in particular, to an information access control method, a first terminal, a second terminal, a server, an information processing system, and a computer storage medium.

BACKGROUND OF THE DISCLOSURE

As intelligent terminals are widely used, information is exchanged more conveniently by using the intelligent terminals. One information exchange form is exchanging information based on a social application. For example, a user publishes text, image, or video information in a social group based on a social application, and a user receiving the text, image, or video information may comment on the information, thereby implementing information exchange between users in the social group. In addition to comment information generated by comments, information in other forms may further be added. Information in more forms and the initially sent information are integrated to facilitate the information exchange between the users in the social group.

In the initially sent information, a part of the information is expected to be open and displayed to all users. For example, information is an image. The part of the information is displayed on a user interface of the social application in a form of a clear thumbnail or a clear image. Another part of the information is encrypted and is expected to be selectively open and displayed to some users. This part of the information can be clearly displayed on the user interface of the social application only when a user responds to the information and feeds back an information form that can be used for correspondingly decrypting the information.

However, there is not yet an effective solution to the foregoing problem in the related art.

SUMMARY

In view of this, implementations of the present disclosure are intended to provide an information access control method, a first terminal, a second terminal, a server, an information processing system, and a computer storage medium, so as to at least resolve problems in the existing technology.

Technical solutions of the implementations of the present disclosure are implemented as follows:

One implementation of the present disclosure provides an information access control method performed at a computer server having one or more processors and memory storing one or more programs to be executed by the one or more processors, the method comprising:

receiving an image sharing request from a first terminal, wherein the first terminal is associated with a first user account of a social networking application and the image sharing request includes a first image to be shared among a user group of the social networking application of which the first user account is a member;

encrypting the first image using an encryption key to obtain a second image that is an encrypted version of the first image;

sending a preview version of the first image to a second terminal, wherein the second terminal is associated with a second user account of the social networking application that is also a member of the user group;

receiving an image viewing request from the second terminal, wherein the image viewing request is generated by the second terminal in response to a user selection of the preview version of the first image at the second terminal and a user-initiated resource transfer from the second user account to the first user account; and returning the second image and a decryption key to the second terminal, wherein the second terminal is configured to restore the first image from the second image using the decryption key.

Another implementation of the present disclosure provides a computer server having one or more processors and memory storing one or more programs that, when executed by the one or more processors, cause the computer server to perform the aforementioned method.

Yet another implementation of the present disclosure provides a non-transitory computer readable storage medium storing a plurality of computer executable operations, wherein the plurality of computer executable operations, when executed by one or more processors of a computer server, cause the computer server to perform the aforementioned method.

According to the implementations of the present disclosure, a first image on an information sending interface of the application is selected, the first image is uploaded, and a first request is generated according to the first image; the first request is sent to a server, to request the server to perform encryption processing on the first image in the first request, so that a second image obtained after the encryption processing is displayed on an information presentation interface of an application running on a second terminal; and payment information returned by the second terminal is received, the payment information being generated by the second terminal by responding to information on the information presentation interface. According to the implementations of the present disclosure, in addition to comment information generated by comments, information in other forms may further be added. Information in more forms and the initially sent information are integrated to facilitate information exchange between users in a social group. Moreover, corresponding to an encryption requirement for a part of information, an encryption mechanism and a corresponding decryption mechanism are specified. Therefore, a requirement for selectively opening and displaying this part of encryption information to some users is satisfied according to the encryption mechanism and the corresponding decryption mechanism, and users can respond to this part of encryption information and feedback an information form that can be used for correspondingly decrypting the information. In this way, decrypted information can be clearly displayed on a user interface of a social application.

DESCRIPTION OF EMBODIMENTS

The following further describes implementation of the technical solutions in detail with reference to the accompanying drawings.

Figure 1:
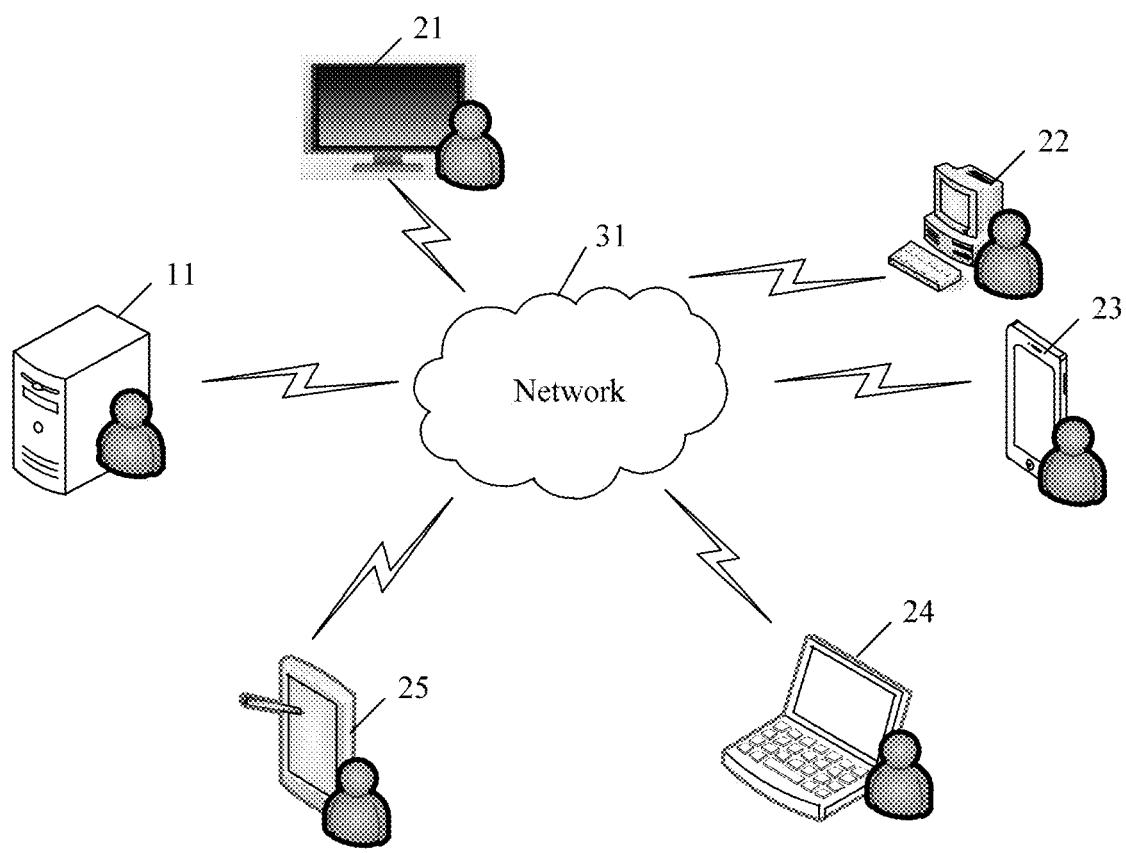
FIG. 1 is a schematic diagram of hardware entities performing information exchange according to an implementation of the present disclosure.

FIG. 1 is a schematic diagram of hardware entities performing information exchange according to an implementation of the present disclosure. FIG. 1 includes one or more servers, terminal devices 21 to 25, and a network 31. The server 11 in FIG. 1 is only an example. The network 31 includes network entities such as a router and a gateway, which are not shown in the figure. The terminal devices 21 to 25 exchange information with the servers by using a wired network or a wireless network. Terminals of the terminal devices 21 to 25 may also exchange information with each other. Each terminal of the terminal devices 21 to 25 may download an application and/or a data packet for updating an application and/or data information or service information related to an application from the server 11. Types of the terminal devices are shown in FIG. 1, including a mobile phone (the terminal 23), a tablet computer or a personal digital assistant (PDA) (the terminal 25), a desk computer (the terminal 22), a PC (the terminal 24), and an all-in-one machine (the terminal 21). Applications such as an application having a social function (for example, a WeChat application), an application having an entertainment function (for example, a video application, an audio playing application, a gaming application, and reading software), and an application having a service function (for example, a map and navigation application) that are required by users are installed in the terminal devices.

Based on the system shown in FIG. 1, for example, exchanged information is image information. According to the implementation of the present disclosure, the terminals of the terminal devices 21 to 25 may be classified into two types, denoted as a first terminal (for example, a terminal corresponding to an image sending party) and a second terminal (for example, a terminal corresponding to an image receiving party) respectively. The first terminal and the second terminal may interact with each other or may exchange information with the servers. On a side of the first terminal, an application runs on the first terminal, a first image on an information sending interface of the application is selected, the first image is uploaded, and a first request is generated according to the first image; the first request is sent to a server, to request the server to perform encryption processing on the first image in the first request, so that a second image obtained after the encryption processing is displayed on an information presentation interface of an application running on a second terminal; and payment information returned by the second terminal is received, the payment information being generated by the second terminal by responding to information on the information presentation interface. On a side of the second terminal, an application runs on the second terminal, at least one image including a second image is displayed on an information presentation interface of the application, the second image being obtained after encryption processing is performed on a first image according to an encryption policy, and a presentation form of the second image being rendered by means of a masking policy and being different from a clear presentation form of another image of the at least one image; a touch operation is performed on the second image to generate a second request, and sending the second request to a server; second prompt information indicating that the image needs to be viewed by means of a payment behavior is received; a payment behavior generated by responding to the second prompt information is obtained, a third request is generated according to the payment behavior, and the third request is sent to the server, to request to perform decryption processing on the second image; and payment information is generated according to the payment behavior, the second terminal instructing the server to send the payment information to a first terminal.

The server processes requests of the first terminal and the second terminal, and performs corresponding encryption and decryption processing according to the different requests sent by the first terminal and the second terminal. The server (a background server of a WeChat application) may be a server having both an image storage function and a mobile payment function, or may include two types of servers (such as an image server and a background server of a WeChat application).

Specifically, for example, the server is a background server of a social networking application such as WeChat (a trademark by Tencent Holdings Ltd.). In this case, that the server processes requests of the first terminal and the second terminal, and performs corresponding encryption and decryption processing according to the different requests sent by the first terminal and the second terminal includes: receiving a first request sent by the first terminal, parsing out a first image from the first request, performing encryption processing on the first image according to an encryption policy, and saving a second image obtained after the encryption processing; receiving a second request sent by the second terminal, determining, according to the second request, whether the requested first image is an encrypted image, and if the first image is an encrypted image, returning, to the second terminal, second prompt information indicating that the image needs to be viewed by means of a payment behavior; receiving a third request sent by the second terminal, the third request being generated by means of the payment behavior; and sending the second image and a decryption key that is corresponding to the encryption policy to the second terminal, so that the second terminal decrypts the second image according to the decryption key, to obtain the requested first image; or decrypting the second image by using a decryption key corresponding to the encryption policy, to obtain the first image, and sending the first image to the second terminal.

Specifically, for example, the server includes an image server and a background server of a WeChat application that are separate disposed. In this case, a first server (the background server of the WeChat application) receives a first request sent by the first terminal, and parses out, from the first request, an original storage address that is in a second server and that corresponds to a first image; encrypts the original storage address according to an encryption and decryption policy agreed on with the second server, to obtain an encrypted storage address; and receives a second request generated and sent by the second terminal by refreshing a same social group to which both the first terminal and the second terminal belong, determines, according to the second request, whether the requested first image is an encrypted image, and if the first image is an encrypted image, returns, to the second terminal, second prompt information indicating that the image needs to be viewed by means of a payment behavior, the encrypted storage address, and a decryption key of the first image. The second server (the image server) receives a third request sent by the second terminal, and parses out the encrypted storage address from the third request; encrypts the encrypted storage address according to the encryption and decryption policy, to obtain the original storage address and a key of a second image, finds a key that is of the first image and that corresponds to the key of the second image, and performs encryption processing on the first image to obtain the second image; and sends the second image to the second terminal for display, and supports the second terminal to decrypt the second image by using the key of the first image to finally obtain the first image.

The example of FIG. 1 is only a system architecture example of the implementations of the present disclosure. The implementations of the present disclosure are not limited to the system structure in FIG. 1. Based on the system architecture, the following implementations of the present disclosure are provided.

Figure 2:
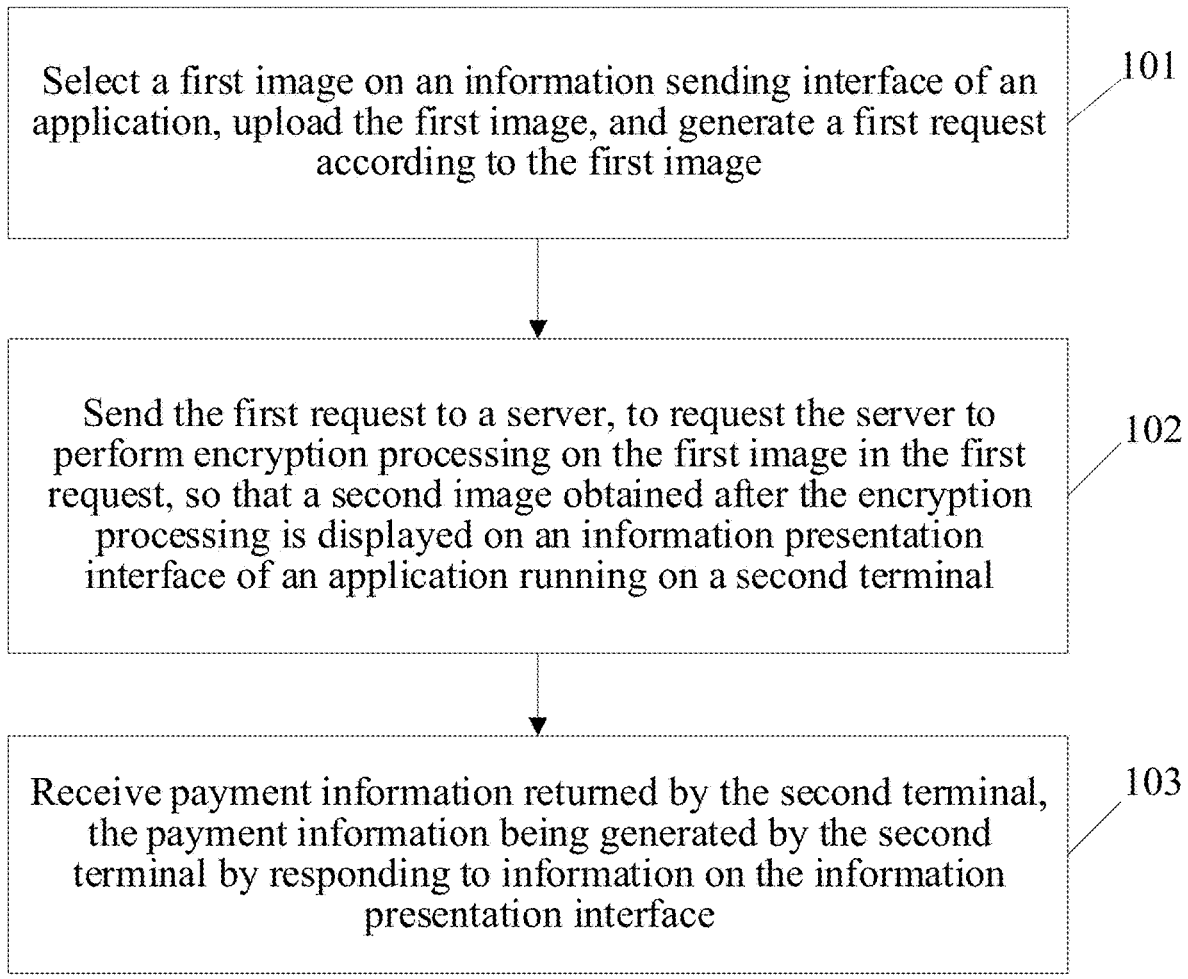
FIG. 2 is a schematic flowchart of an implementation according to some implementations of the present disclosure.

This implementation of the present disclosure provides an information access control method. As shown in FIG. 2, the method is applied to a first terminal (for example, a terminal corresponding to an image sending party), an application runs on the first terminal, and the method includes the following operations:

Operation 101: Select a first image on an information sending interface of the application, upload the first image, and generate a first request according to the first image.

Herein, the first image published by the first terminal is an image that is not encrypted, and a second image is obtained after a server is requested to perform encryption processing in operation 102. The second image is an encrypted image, and is finally presented on an application interface of a second terminal. Nevertheless, not all images published by the first terminal need to be encrypted, and some images may not be encrypted. A specific implementation is: In initially sent information (for example, the first image), a part of the information is expected to be open and displayed to all users. The part (an image that is not encrypted, for example, the first image is directly presented on the application interface of the second terminal) of the information is displayed on a user interface of a social application (for example, a WeChat application) in a form of a clear thumbnail or a clear image. Another part of the information is encrypted (for example, the second image obtained after the first image is encrypted) and is expected to be selectively open and displayed to some users. This part of the information can be clearly displayed on the user interface of the social application only when a user responds to the information and feeds back an information form that can be used for correspondingly decrypting the information. Only a blurred image (the blurred image may be an image undergoing mask adding processing) can be viewed when a user cannot feedback an information form that is used for correspondingly decrypting the information. However, feeding back an extra information form increases processing costs of information exchange. If the exchange is worthless, more exchange leads to higher processing costs, lower efficiency, and more negative impact on the congestion in a network environment. Therefore, corresponding decryption processing is performed on the second image after the following processing described in some implementations: The second terminal determines that an extra information form of the blurred image is necessarily returned; the first terminal obtains the feedback (for example, payment information returned by the second terminal to the first terminal in operation 103); the server, the first terminal, the second terminal exchange information with each other; and the server performs, according to a requirement, encryption processing on the first image that is requested to be published by the first terminal, obtains the encrypted second image, and receives and decrypts a request from the second terminal. In this way, an image layer that is covered on the second image displayed on the application interface of the second terminal and that is initially rendered by means of a masking policy can be removed, thereby viewing an entire image clearly presented on the application interface of the second terminal. It should be noted that before the image layer that is covered on the image and that is rendered by means of the masking policy is removed, a presentation form of the second image on the application interface of the second terminal is an image layer covered presentation form, the presentation form being different from a clear presentation form of another image on an information presentation interface of the application.

Operation 102: Send the first request to a server, to request the server to perform encryption processing on the first image in the first request, so that a second image obtained after the encryption processing is displayed on an information presentation interface of an application running on a second terminal.

Operation 103: Receive payment information returned by the second terminal (for example, payment information in a red envelope form), the payment information being generated by the second terminal by responding to information on the information presentation interface.

Figure 3:
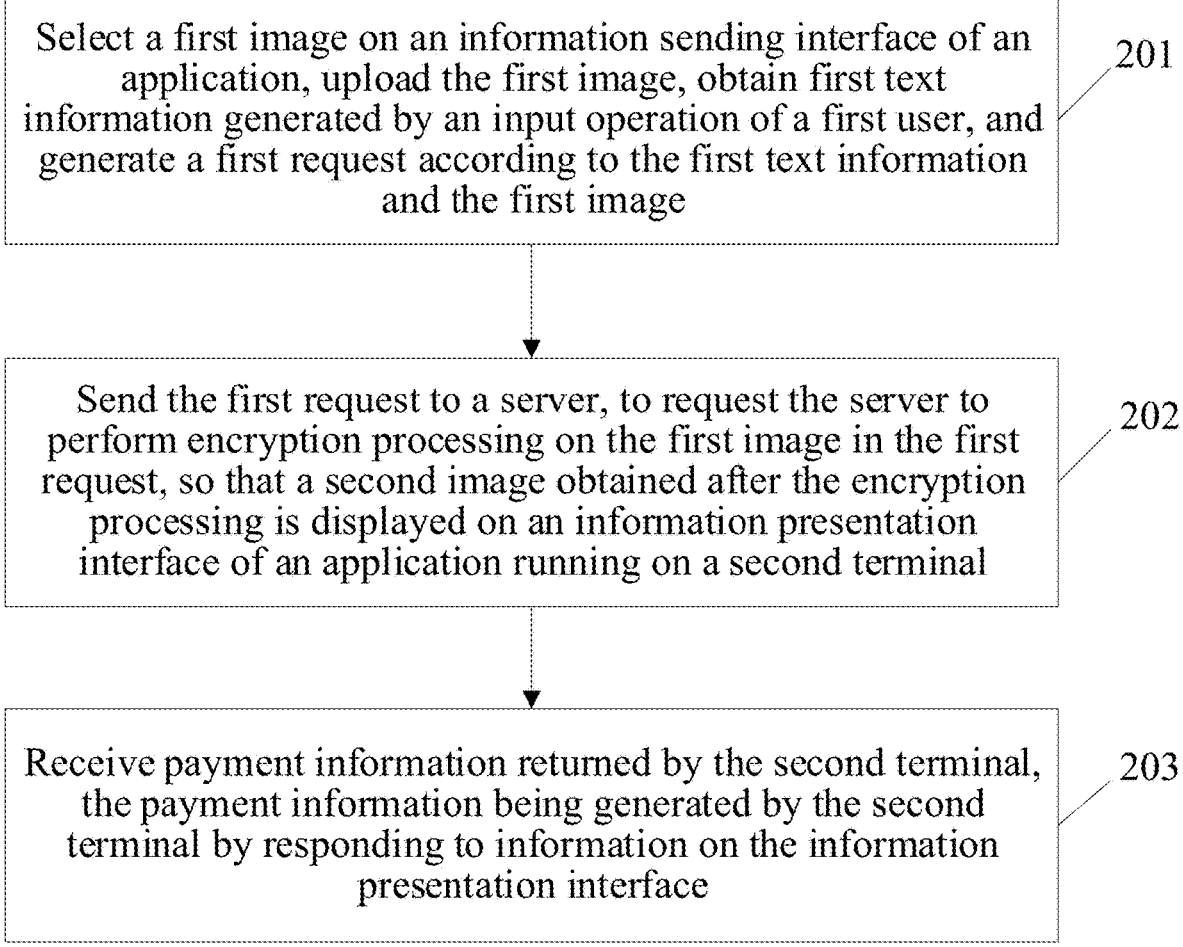
FIG. 3 is a schematic flowchart of an implementation according to some implementations of the present disclosure.

This implementation of the present disclosure provides an information access control method. As shown in FIG. 3, the method is applied to a first terminal (for example, a terminal corresponding to an image sending party), an application runs on the first terminal, and the method includes the following operations:

Operation 201: Select a first image on an information sending interface of the application, upload the first image, obtain first text information generated by an input operation of a first user, and generate the first request according to the first text information and the first image.

Herein, the selecting a first image on an information sending interface of the application includes: obtaining a touch operation at an image collection entry, a presentation form of the image collection entry being rendered in a form different from an existing collection presentation form; and responding to the touch operation to present first prompt information, the first prompt information being used for prompting a first terminal user to select the first image, to request the payment information from a second terminal user. For example, a camera icon may be specialized, and the specialized camera icon is used as an entry of a red envelope photo. A photo is selected through the entry. The first terminal user and the second terminal user belong to a same social group.

Herein, the first image published by the first terminal is an image that is not encrypted, and a second image is obtained after a server is requested to perform encryption processing in operation 202. The second image is an encrypted image, and is finally presented on an application interface of a second terminal. Nevertheless, not all images published by the first terminal need to be encrypted, and some images may not be encrypted. A specific implementation is: In initially sent information (for example, the first image), a part of the information is expected to be open and displayed to all users. The part (an image that is not encrypted, for example, the first image is directly presented on the application interface of the second terminal) of the information is displayed on a user interface of a social application (for example, a WeChat application) in a form of a clear thumbnail or a clear image. Another part of the information is encrypted (for example, the second image obtained after the first image is encrypted) and is expected to be selectively open and displayed to some users. This part of the information can be clearly displayed on the user interface of the social application only when a user responds to the information and feeds back an information form that can be used for correspondingly decrypting the information. Only a blurred image (the blurred image may be an image undergoing mask adding processing) can be viewed when a user cannot return an information form that is used for correspondingly decrypting the information. However, feeding back an extra information form increases processing costs of information exchange. If the exchange is worthless, more exchange leads to higher processing costs, lower efficiency, and more negative impact on the congestion in a network environment. Therefore, corresponding decryption processing is performed on the second image after the following processing described in the aforementioned implementation: The second terminal determines that an extra information form of the blurred image is necessarily returned; the first terminal obtains the feedback (for example, payment information returned by the second terminal to the first terminal in operation 203); the server, the first terminal, the second terminal exchange information with each other; and the server performs, according to a requirement, encryption processing on the first image that is requested to be published by the first terminal, obtains the encrypted second image, and receives and decrypts a request from the second terminal. In this way, an image layer that is covered on the second image displayed on the application interface of the second terminal and that is initially rendered by means of a masking policy can be removed, thereby viewing an entire image clearly presented on the application interface of the second terminal. It should be noted that before the image layer that is covered on the image and that is rendered by means of the masking policy is removed, a presentation form of the second image on the application interface of the second terminal is an image layer covered presentation form, the presentation form being different from a clear presentation form of another image on an information presentation interface of the application.

The masking policy includes at least one of the following: blurring processing, direct blackout, and voiding. The blurring processing may be performed by using a ground glass mask.

Operation 202: Send the first request to a server, to request the server to perform encryption processing on the first image in the first request, so that a second image obtained after the encryption processing is displayed on an information presentation interface of an application running on a second terminal.

Herein, the second image is displayed in a presentation form that is of covering an image layer on an image and that is rendered by means of a masking policy, the presentation form being different from a clear presentation form of another image on the information presentation interface of the application.

Operation 203: Receive payment information returned by the second terminal (for example, payment information in a red envelope form), the payment information being generated by the second terminal by responding to information on the information presentation interface.

Figure 4:
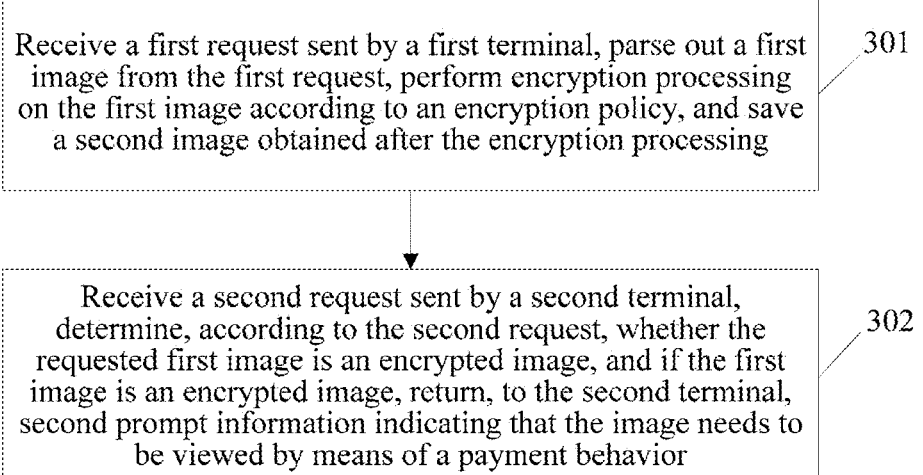
FIG. 4 is a schematic flowchart of an implementation according to some implementations of the present disclosure.

This implementation of the present disclosure provides an information access control method. As shown in FIG. 4, the method is applied to a server, and the method includes the following operations:

Operation 301: Receive a first request sent by a first terminal, parse out a first image from the first request, perform encryption processing on the first image according to an encryption policy, and save a second image obtained after the encryption processing.

Operation 302: Receive a second request sent by a second terminal, determine, according to the second request, whether the requested first image is an encrypted image, and if the first image is an encrypted image, return, to the second terminal, second prompt information indicating that the image needs to be viewed by means of a payment behavior.

According to this implementation of the present disclosure, the server has payment and image storage functions. Therefore, the server can encrypt and decrypt an image, and integrate image content presentation and mobile payment.

In an implementation of the present disclosure, the method further includes the following operations:

Operation 401: Receive a third request sent by the second terminal, the third request being generated by means of the payment behavior.

Operation 402: Send the second image and a decryption key that is corresponding to the encryption policy to the second terminal, so that the second terminal decrypts the second image according to the decryption key, to obtain the requested first image; or decrypt the second image by using a decryption key corresponding to the encryption policy, to obtain the first image, and send the first image to the second terminal.

Herein, the first image is a clear presentation form of an entire image obtained after an entire image layer covered on the image is removed after demasking processing.

In an implementation of the present disclosure, the method further includes: sending, to the second terminal, third prompt information indicating that the image is viewed by means of a payment-free behavior by random default, for example, a prompt indicating that a user can view the original image only by means of cash payment or virtual currency payment, which may be a prompt indicating that the original image is viewed for free after a lottery is won.

In an implementation of the present disclosure, the method further includes the following operations:

Operation 501: Receive a fourth request sent by the second terminal, the fourth request being generated by means of a payment-free behavior by random default.

Operation 502: Send the second image and a decryption key that is corresponding to the encryption policy to the second terminal, so that the second terminal decrypts the second image according to the decryption key, to obtain the requested first image; or decrypt the second image by using a decryption key corresponding to the encryption policy, to obtain the first image, and send the first image to the second terminal.

Herein, the first image is a clear presentation form of an entire image obtained after an entire image layer covered on the image is removed after demasking processing.

In an implementation of the present disclosure, the method further includes: sending, to the second terminal, third prompt information indicating that the image is viewed by means of a payment-free behavior by random default. for example, a prompt indicating that a user can view the original image only by means of cash payment or virtual currency payment, which may be a prompt indicating that the original image is viewed for free after a lottery is won.

This implementation of the present disclosure provides an information access control method. The method is applied to a second terminal, an application runs on the second terminal, and the method includes the following operations:

Operation 601: A second image obtained after encryption processing is performed on a first image according to an encryption policy exists in at least one image displayed on an information presentation interface (for example, a timeline in moments) of the application, and a presentation form of the second image being rendered by means of a masking policy and being different from a clear presentation form of another image of the at least one image.

Herein, the masking policy includes at least one of the following: blurring processing, direct blackout, and voiding.

Operation 602: Perform a touch operation on the second image to generate a second request, and sending the second request to a server.

Operation 603: Receive second prompt information indicating that the image needs to be viewed by means of a payment behavior.

Operation 604: Obtain a payment behavior generated by responding to the second prompt information, generating a third request according to the payment behavior, and sending the third request to the server, to request to perform decryption processing on the second image.

Operation 605: Generate payment information according to the payment behavior, the second terminal instructing the server to send the payment information to a first terminal.

In an implementation of the present disclosure, the method further includes:

receiving the second image and a decryption key that is corresponding to the encryption policy;

decrypting, by the second terminal, the second image according to the decryption key, to obtain the requested first image; or receiving the first image, the first image being a first image obtained after the server decrypts the second image by using a decryption key corresponding to the encryption policy; and the first image presented on the information presentation interface of the application being a clear presentation form of an entire image obtained after an entire image layer covered on the image is removed after demasking processing.

In an implementation of the present disclosure, the method further includes:

receiving third prompt information indicating that the image is viewed by means of a payment-free behavior by random default; and obtaining a payment-free behavior generated by responding to the third prompt information, generating a fourth request according to the payment-free behavior, and sending the fourth request to the server, to request to perform decryption processing on the second image.

In an implementation of the present disclosure, the method further includes:

receiving the second image and a decryption key that is corresponding to the encryption policy;

decrypting, by the second terminal, the second image according to the decryption key, to obtain the requested first image; or receiving the first image, the first image being a first image obtained after the server decrypts the second image by using a decryption key corresponding to the encryption policy; and the first image presented on the information presentation interface of the application being a clear presentation form of an entire image obtained after an entire image layer covered on the image is removed after demasking processing.

In an implementation of the present disclosure, a first terminal user corresponding to the first terminal and a second terminal user corresponding to the second terminal belong to a same social group.

Figure 5:
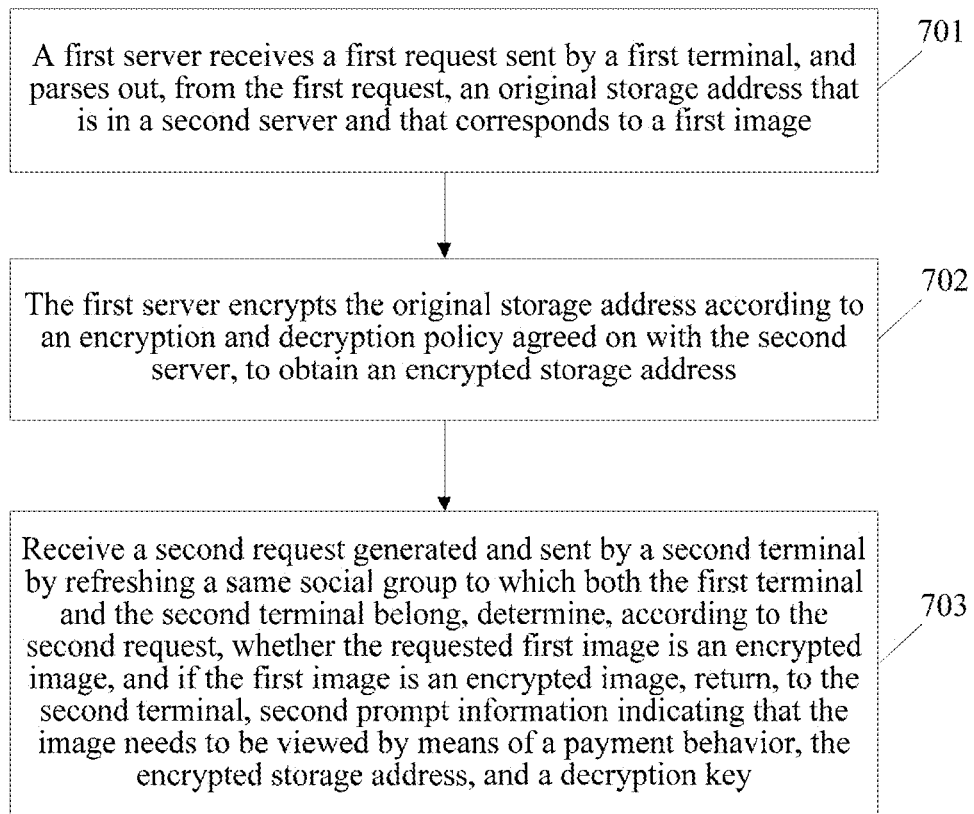
FIG. 5 is a schematic structural diagram of a composition according to some implementations of the present disclosure.

This implementation of the present disclosure provides an information access control method. As shown in FIG. 5, the method includes the following operations:

Operation 701: A first server (for example, a background server of a WeChat application) receives a first request sent by a first terminal, and parses out, from the first request, an original storage address that is in a second server (for example, an image server) and that corresponds to a first image.

Operation 702: The first server encrypts the original storage address according to an encryption and decryption policy agreed on with the second server, to obtain an encrypted storage address.

Operation 703: Receive a second request (for example, a request for browsing the moments instead of an image preview request) generated and sent by a second terminal by refreshing a same social group to which both the first terminal and the second terminal belong, determine, according to the second request, whether the requested first image is an encrypted image, and if the first image is an encrypted image, return, to the second terminal, second prompt information indicating that the image needs to be viewed by means of a payment behavior, the encrypted storage address, and a decryption key (for example, enckey, which is different from enckeyidx) of the first image.

In an implementation of the present disclosure, the method further includes the following operations:

Operation 801: The second server receives a third request sent by the second terminal, and parses out the encrypted storage address from the third request.

Operation 802: Encrypt the encrypted storage address according to the encryption and decryption policy, to obtain the original storage address and a key (for example, enckeyidx) of a second image, find a key that is of the first image and that corresponds to the key of the second image, and perform encryption processing on the first image to obtain the second image.

Operation 803: Send the second image to the second terminal for display, and support the second terminal to decrypt the second image by using the key of the first image to finally obtain the first image.

In an implementation of the present disclosure, a presentation form of the second image is rendered by means of a masking policy and is different from a clear presentation form of another image of at least one image on an information presentation interface of an application running on the second terminal; and the first image is a clear presentation form of an entire image obtained after an entire image layer covered on the image is removed after demasking processing.

This implementation of the present disclosure provides a first terminal. An application runs on the first terminal, and the first terminal includes: a generation unit, configured to: select a first image on an information sending interface of the application, upload the first image, and generate a first request according to the first image; a sending unit, configured to send the first request to a server, to request the server to perform encryption processing on the first image in the first request, so that a second image obtained after the encryption processing is displayed on an information presentation interface of an application running on a second terminal; and a receiving unit, configured to receive payment information returned by the second terminal, the payment information being generated by the second terminal by responding to information on the information presentation interface.

In some implementations, the first server receives an image sharing request from the first terminal. The first terminal is associated with a first user account of a social networking application and the image sharing request includes a first image to be shared among a user group of the social networking application of which the first user account is a member. The first server then encrypts the first image using an encryption key to obtain a second image that is an encrypted version of the first image and sends a preview version of the first image to a second terminal. In some implementations, the preview version of the first image is one selected from the group consisting of a low-resolution version of the first image, a randomly selected portion of the first image at its original resolution, and a combination of both. The second terminal is associated with a second user account of the social networking application that is also a member of the user group.

The first server receives an image viewing request from the second terminal. The image viewing request is generated by the second terminal in response to a user selection of the preview version of the first image at the second terminal and a user-initiated resource transfer from the second user account to the first user account. Finally, the first server returns the second image and a decryption key to the second terminal. The second terminal then restores the first image from the second image using the decryption key. In some implementations, the encryption key is the same as the decryption key because they are supporting a symmetric encryption algorithm.

In some implementations, the image sharing request from the first terminal further includes a text message and the text message is sent to the second terminal along with the preview version of the first image.

In some implementations, the restored first image has an associated expiration timestamp after which the restored first image is replaced by the preview version of the first image at the second terminal. For example, the expiration timestamp of the restored first image is dependent upon the user-initiated resource transfer from the second user account to the first user account. The more payment that the second user account pays the first user account, the restored first image stays longer on the second terminal and the expiration timestamp is further pushed back.

In an actual application of this implementation of the present disclosure, the first image published by the first terminal is an image that is not encrypted. The first terminal requests the server to perform encryption processing to obtain the second image. The second image is an encrypted image, and is finally presented on the application interface of the second terminal. However, not all images published by the first terminal need to be encrypted, and some images may not be encrypted. A specific implementation is: In initially sent information (for example, the first image), a part of the information is expected to be open and displayed to all users. The part (an image that is not encrypted, for example, the first image is directly presented on the application interface of the second terminal) of the information is displayed on a user interface of a social application (for example, a WeChat application) in a form of a clear thumbnail or a clear image. Another part of the information is encrypted (for example, the second image obtained after the first image is encrypted) and is expected to be selectively open and displayed to some users. This part of the information can be clearly displayed on the user interface of the social application only when a user responds to the information and feeds back an information form that can be used for correspondingly decrypting the information. Only a blurred image (the blurred image may be an image undergoing mask adding processing) can be viewed when a user cannot return an information form that is used for correspondingly decrypting the information. However, feeding back an extra information form increases processing costs of information exchange. If the exchange is worthless, more exchange leads to higher processing costs, lower efficiency, and more negative impact on the congestion in a network environment. Therefore, corresponding decryption processing is performed on the second image after the following processing described in the aforementioned implementation: The second terminal determines that an extra information form of the blurred image is necessarily returned; the first terminal obtains the feedback (for example, payment information returned by the second terminal to the first terminal); the server, the first terminal, the second terminal exchange information with each other; and the server performs, according to a requirement, encryption processing on the first image that is requested to be published by the first terminal, obtains the encrypted second image, and receives and decrypts a request from the second terminal. In this way, an image layer that is covered on the second image displayed on the application interface of the second terminal and that is initially rendered by means of a masking policy can be removed, thereby viewing an entire image clearly presented on the application interface of the second terminal. It should be noted that before the image layer that is covered on the image and that is rendered by means of the masking policy is removed, a presentation form of the second image on the application interface of the second terminal is an image layer covered presentation form, the presentation form being different from a clear presentation form of another image on an information presentation interface of the application.

In an implementation of the present disclosure, the first terminal further includes:

an obtaining unit, configured to obtain, after the selecting a first image on an information sending interface of the application, first text information generated by an input operation of a first user; and the generation unit is further configured to generate the first request according to the first text information and the first image.

In an implementation of the present disclosure, the generation unit includes:

an operation obtaining subunit, configured to obtain a touch operation at an image collection entry, a presentation form of the image collection entry being rendered in a form different from an existing collection presentation form; and an operation response subunit, configured to respond to the touch operation to present first prompt information, the first prompt information being used for prompting a first terminal user to select the first image, to request the payment information from a second terminal user; and the first terminal user and the second terminal user belonging to a same social group.

This implementation of the present disclosure provides a server, the server including:

an encryption unit, configured to: receive a first request sent by a first terminal, parse out a first image from the first request, perform encryption processing on the first image according to an encryption policy, and save a second image obtained after the encryption processing; and a determining unit, configured to: receive a second request sent by a second terminal, determine, according to the second request, whether the requested first image is an encrypted image, and if the first image is an encrypted image, return, to the second terminal, second prompt information indicating that the image needs to be viewed by means of a payment behavior.

In an implementation of the present disclosure, the server further includes:

a first request receiving unit, configured to receive a third request sent by the second terminal, the third request being generated by means of the payment behavior; and a first sending unit, configured to: send the second image and a decryption key that is corresponding to the encryption policy to the second terminal, so that the second terminal decrypts the second image according to the decryption key, to obtain the requested first image; or decrypt the second image by using a decryption key corresponding to the encryption policy, to obtain the first image, and sending the first image to the second terminal.

In an implementation of the present disclosure, the server further includes:

an information sending unit, configured to send, to the second terminal, third prompt information indicating that the image is viewed by means of a payment-free behavior by random default.

In an implementation of the present disclosure, the server further includes:

a second request receiving unit, configured to receive a fourth request sent by the second terminal, the fourth request being generated by means of a payment-free behavior by random default; and a second sending unit, configured to: send the second image and a decryption key that is corresponding to the encryption policy to the second terminal, so that the second terminal decrypts the second image according to the decryption key, to obtain the requested first image; or decrypt the second image by using a decryption key corresponding to the encryption policy, to obtain the first image, and sending the first image to the second terminal.

This implementation of the present disclosure provides a second terminal. An application runs on the second terminal, and the second terminal includes:

an information display unit, configured to: a second image obtained after encryption processing is performed on a first image according to an encryption policy exists in at least one image displayed on an information presentation interface of the application, and a presentation form of the second image being rendered by means of a masking policy and being different from a clear presentation form of another image of the at least one image;

a request sending unit, configured to: perform a touch operation on the second image to generate a second request, and send the second request to a server;

a request receiving unit, configured to receive second prompt information indicating that the image needs to be viewed by means of a payment behavior;

a decryption request sending unit, configured to: obtain a payment behavior generated by responding to the second prompt information, generating a third request according to the payment behavior, and sending the third request to the server, to request to perform decryption processing on the second image; and a notification unit, configured to generate payment information according to the payment behavior, the second terminal instructing the server to send the payment information to a first terminal.

In an implementation of the present disclosure, the second terminal further includes:

a first receiving unit, configured to receive the second image and a decryption key that is corresponding to the encryption policy; and a decryption unit, configured to: decrypt, by the second terminal, the second image according to the decryption key, to obtain the requested first image; or receive the first image, the first image being a first image obtained after the server decrypts the second image by using a decryption key corresponding to the encryption policy; and the first image presented on the information presentation interface of the application is a clear presentation form of an entire image obtained after an entire image layer covered on the image is removed after demasking processing.

In an implementation of the present disclosure, the second terminal further includes:

a second receiving unit, configured to: receive third prompt information indicating that the image is viewed by means of a payment-free behavior by random default; and the decryption request sending unit is further configured to: obtain a payment-free behavior generated by responding to the third prompt information, generate a fourth request according to the payment-free behavior, and send the fourth request to the server, to request to perform decryption processing on the second image.

In an implementation of the present disclosure, the second terminal further includes:

a first receiving unit, configured to receive the second image and a decryption key that is corresponding to the encryption policy; and a decryption unit, configured to: decrypt, by the second terminal, the second image according to the decryption key, to obtain the requested first image; or receive the first image, the first image being a first image obtained after the server decrypts the second image by using a decryption key corresponding to the encryption policy; and the first image presented on the information presentation interface of the application is a clear presentation form of an entire image obtained after an entire image layer covered on the image is removed after demasking processing.

In an implementation of the present disclosure, a first terminal user corresponding to the first terminal and a second terminal user corresponding to the second terminal belong to a same social group.

This implementation of the present disclosure provides an information processing system. The information processing system includes a first server and a second server supported to interact with the first server.

The first server includes:

an address receiving unit, configured to: receive a first request sent by a first terminal, and parse out, from the first request, an original storage address that is in a second server and that corresponds to a first image an address encryption unit, configured to encrypt, by the first server, the original storage address according to an encryption and decryption policy agreed on with the second server, to obtain an encrypted storage address; and a determining unit, configured to: receive a second request generated and sent by a second terminal by refreshing a same social group to which both the first terminal and the second terminal belong, determine, according to the second request, whether the requested first image is an encrypted image, and if the first image is an encrypted image, return, to the second terminal, second prompt information indicating that the image needs to be viewed by means of a payment behavior, the encrypted storage address, and a decryption key of the first image.

In an implementation of the present disclosure, the second server includes:

a parsing unit, configured to: receive a third request sent by the second terminal, and parse out the encrypted storage address from the third request;

an encryption unit, configured to: encrypt the encrypted storage address according to the encryption and decryption policy, to obtain the original storage address and a key of a second image, find a key that is of the first image and that corresponds to the key of the second image, and perform encryption processing on the first image to obtain the second image; and an image sending unit, configured to send the second image to the second terminal for display, and support the second terminal to decrypt the second image by using the key of the first image to finally obtain the first image.

In an implementation of the present disclosure, a presentation form of the second image is rendered by means of a masking policy and is different from a clear presentation form of another image of at least one image on an information presentation interface of an application running on the second terminal; and the first image is a clear presentation form of an entire image obtained after an entire image layer covered on the image is removed after demasking processing.

This implementation of the present disclosure further provides a computer storage medium storing a computer program, the computer program being used for performing the foregoing information access control method.

The first terminal and the second terminal may be electronic devices such as PCs, or may be portable electronic devices such as PADs, tablet computers, or handheld computers, or may be intelligent mobile terminals such as mobile phones, and are not limited thereto. The servers may be formed by using a cluster system and are electronic devices that are integrated or separately disposed for implementing functions of units. The first terminal, the second terminal, and the server each include at least a database for storing data and a processor for data processing, or include a storage medium disposed in the server or an independently disposed storage medium.

When performing processing, the processor for data processing may be implemented as a microprocessor, a CPU, a DSP, or an FPGA. The storage medium includes an operation instruction. The operation instruction may be computer executable code. The operation instruction is used for performing the operations in the process of the information access control method in the foregoing implementations of the present disclosure.

Figure 6:
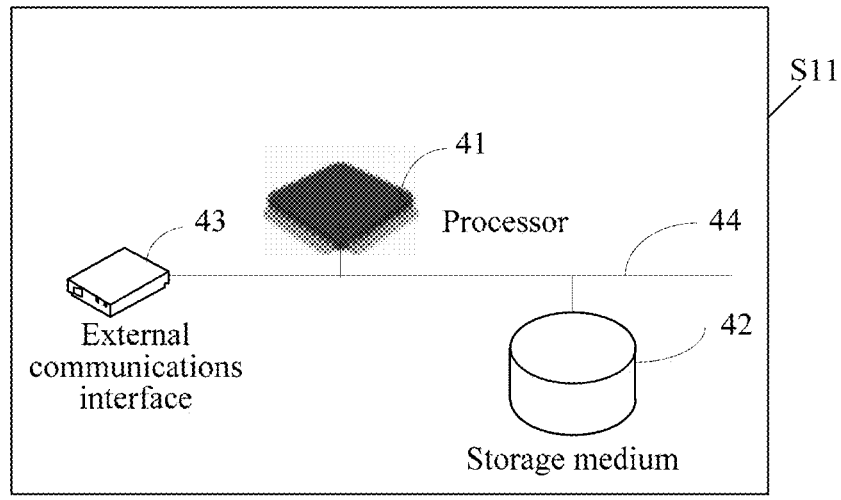
FIG. 6 is a schematic structural diagram of a composition according to some implementations of the present disclosure.

The first terminal, the second terminal, and the server are used as examples of hardware entities S11 and are shown in FIG. 6. The apparatus includes a processor 41, a storage medium 42, and at least one external communications interface 43. The processor 41, the storage medium 42, and the external communications interface 43 are connected by using a bus 44.

The implementations of the present disclosure are described as follows by using an example of a real application scenario:

This application scenario applies the implementations of the present disclosure, and includes a new red envelope application: receiving a red envelope by publishing a red envelope photo in moments. Abbreviations and key term definitions include a red envelope photo, which is a new publishing type of WeChat moments. An image pulled by a user on a timeline is encrypted. The user can decrypt the image only after sending a red envelope to a publisher. According to the implementations of the present disclosure, for such a publishing type, that is, a red envelope photo, newly added in WeChat moments, a user can proactively publishes a precious photo in the moments and adds descriptions, to attract friends of the user to click and view. A friend can only see a thumbnail or an image that undergoes blurring processing, and can see a clear photo and unlock the like and comment functions only by sending a red envelope of a random amount to the publisher. This publishing type is important integration of content proactively published by a user and a mobile payment capability in the WeChat client, which, on one hand, encourages a user to publish content of a high value in moments to obtain a red envelope from a friend as an incentive, and on the other hand, implements a requirement of a user for asking for a red envelope from a friend in a New Year scene.

For the foregoing application scenario, there are mainly three forms of sending a red envelope in WeChat: (1) Users send red envelopes to each other during chat in WeChat. (2) An enterprise sends cash vouchers to target users on the official account or by using a service notification. (3) An enterprise sends, by using the "shake" function, cash vouchers to some users who send effective requests to servers by shaking their mobile phones in unit time. Although an existing red envelope function plays a social role, this still only implements fund transfer. The "red envelope photo" is a combination of content proactively published by a user and a mobile payment capability in WeChat moments. Adding the publishing type in the moments encourages a user to publish original content in the moments and help the user obtain a red envelope from a friend as an incentive.

This application scenario applies the implementations of the present disclosure, and includes a new publishing type in the moments: a red envelope photo. As a publishing type newly added in the moments, a representation form of the "red envelope photo" includes the following content:

1. A user uploads a photo and adds descriptions to the photo.

2. A WeChat friend who can view the moments feed views, on a timeline, an image that undergoes blurring processing, and cannot use the like and comment functions for the moments feed.

3. The WeChat friend who can view the moments feed clicks on a thumbnail on the timeline to enter an image preview mode, so as to view clear images of different regions.

4. The WeChat friend who can view the moments feed may choose to send a red envelope having a random amount to the publisher, and can view a complete clear image (which is different from the images of the different regions, and is a complete image, all content of the photo can be presented) after the red envelope is successfully sent, and can like and comment on the feed.

Figure 7:
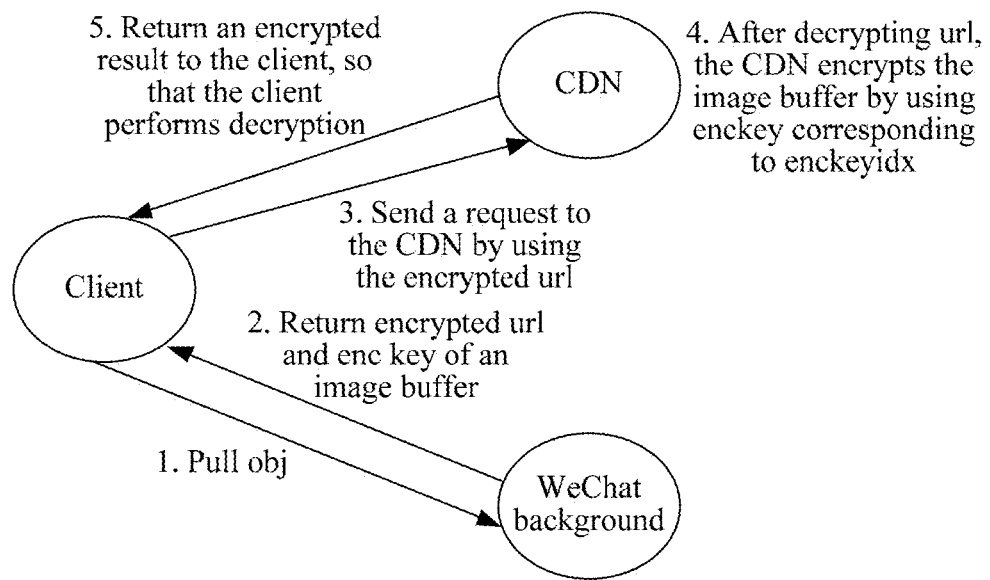
FIG. 7 to FIG. 21 are schematic diagrams of multiple application scenarios applying the implementations of the present disclosure.

For the foregoing representation form, during interaction using the publishing type of the "red envelope photo", as shown in FIG. 7, an encryption and decryption process related to an image includes the following content:

1. A storage address of an image server is encrypted in the WeChat background, and an encrypted storage address includes fileid and enckeyidx. Both the WeChat background and the image storage server understand an encryption algorithm. When a client pulls obj from the WeChat background, that is, browsing the moments, the WeChat background notifies the client whether the image is encrypted, and notifies the client of a decryption key of the image.

2. The client learns the encrypted image storage url address from the WeChat background, and requests, by using the encrypted url address when a user clicks to view an image, to download the image from the server.

3. The server decrypts the image storage url address to obtain enckeyidx and the original fileid, and finds enckey corresponding to idx by means of a configuration, and uses enckey to symmetrically encrypt the image.

4. The server delivers the encrypted image to the client, and the client decrypts the image by using enckey obtained when pulling obj.

A CDN (Content Delivery Network) is a distributed content delivery network constructed on a data network. A function of the CDN is to use a stream media server cluster technology to overcome disadvantages of lacking output bandwidth of a stand-alone system and a concurrency capability, so as to greatly improve a quantity of concurrent streams supported by the system and reduce or avoid negative impact caused by a single point failure. The CDN uses a global load balancing technology to direct access of a user to a stream media server that operates normally and that is closest to the user, so that the stream media server directly responds to a request of the user. If content to be access by the user does not exist in the server, the server may be automatically configured to capture corresponding content from an original server and provide the content to the user. An interactive personality TV (IPTV) can use the CDN to provide a video on demand (VOD, Video-On-Demand) service to the user, and deliver, by using the CDN, video content to a CDN node close to a user side, so as to ensure end-to-end quality of service to some extent.

Beneficial effects of the implementations of the present disclosure are: This publishing type is important integration of content proactively published by a user and a mobile payment capability in the WeChat client, which, on one hand, encourages a user to publish content of a high value in moments to obtain a red envelope from a friend as an incentive, and on the other hand, implements a requirement of a user for asking for a red envelope from a friend in a New Year scene.

Figure 8:
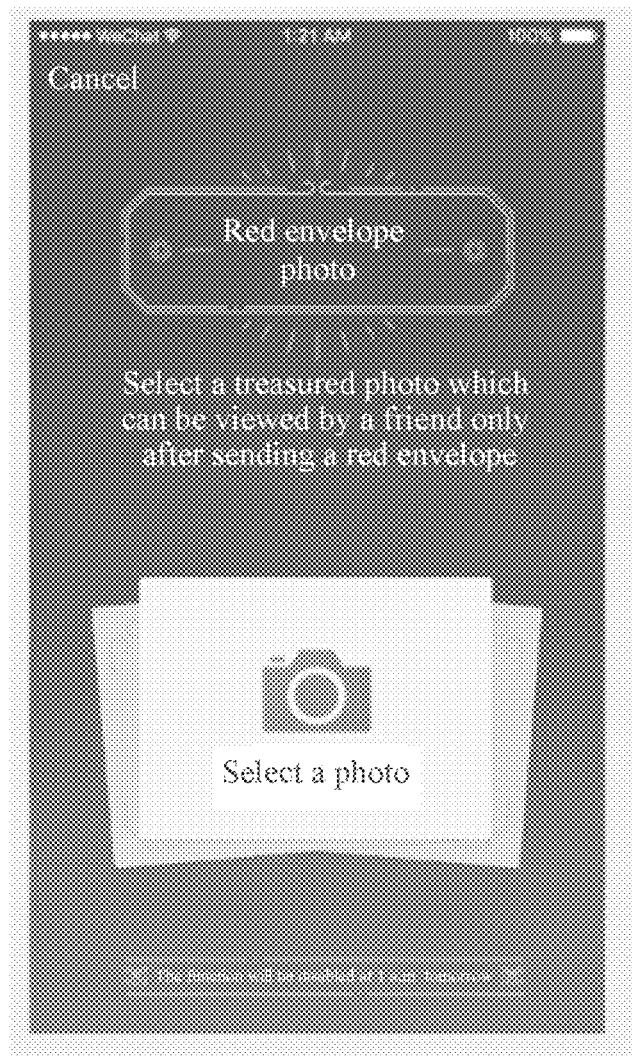
Figure 9:
Figure 10:
Figure 11:
Figure 12:
Figure 13:
Figure 14:
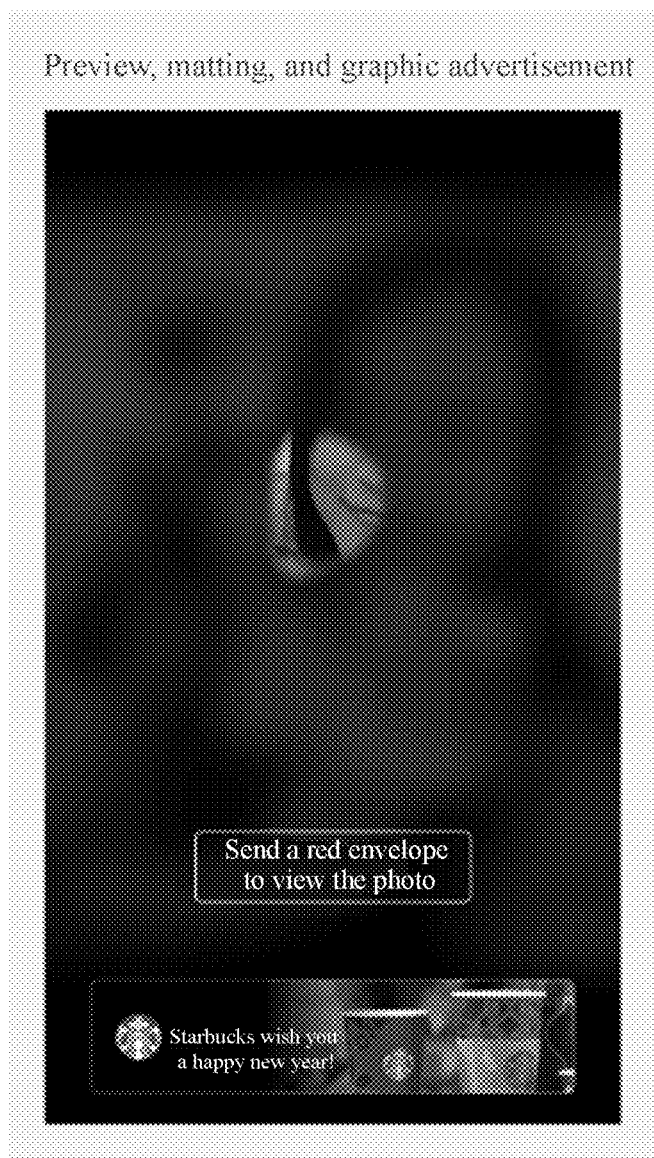
Figure 15:
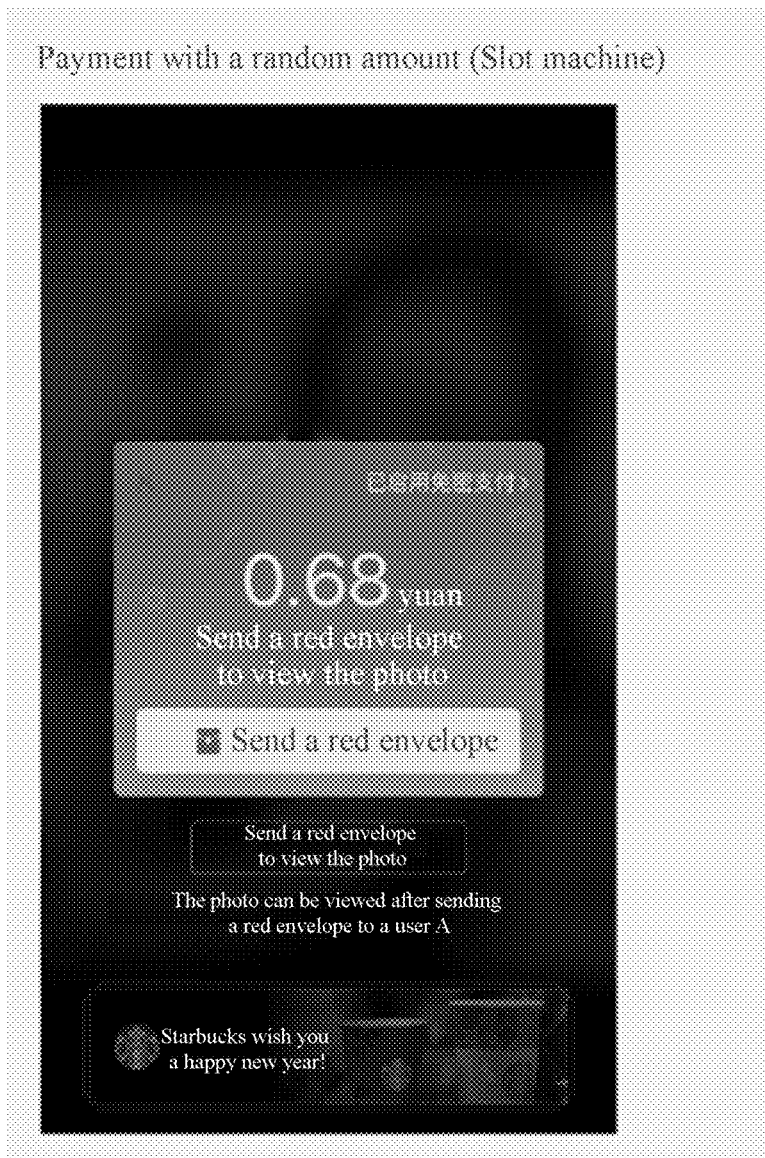
Figure 16:
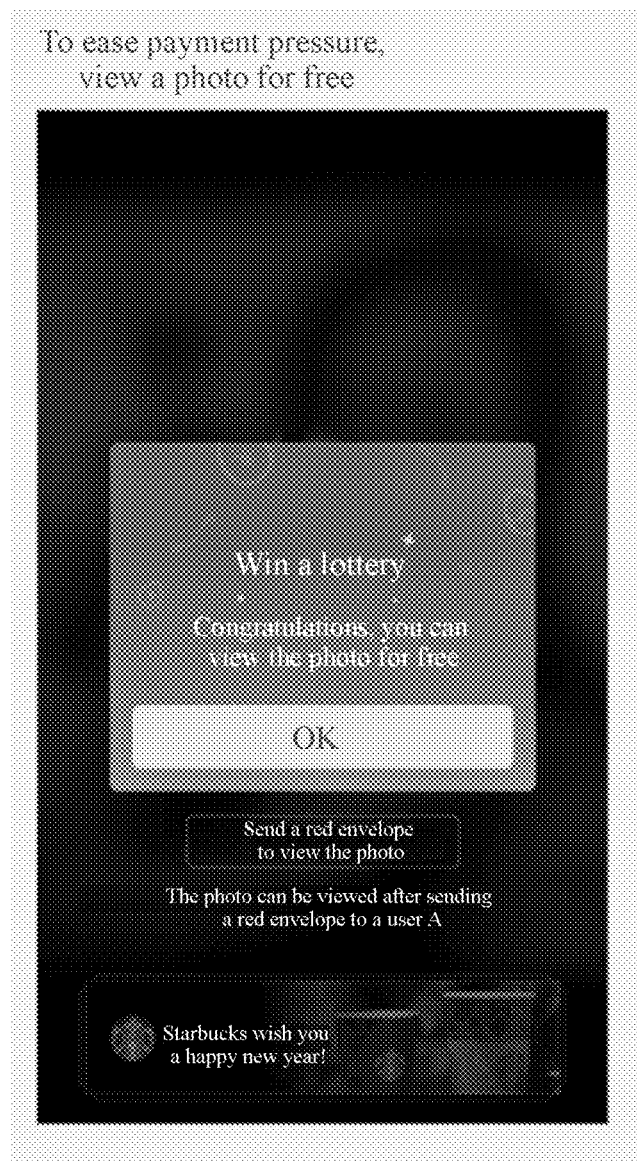
Figure 17:

Multiple application scenarios involved in the information exchange process of encryption and decryption are shown in FIG. 8 to FIG. 17. FIG. 8 to FIG. 11 are schematic diagrams of a user interface displayed on an application interface of a first terminal. FIG. 8 is a schematic diagram of uploading any first image. FIG. 9 is a schematic diagram of inputting text information corresponding to the any first image after the image is uploaded. FIG. 10 is a schematic diagram of publishing the image; in this case, the image is actually a second image obtained after the any first image uploaded by a user is encrypted. For example, the second image is covered by an image layer of a mask type, which may certainly be an image that is not of a mask type and that is obtained by means of another masking policy. The left side of FIG. 11 is a schematic diagram of reviewing the first image by the image publisher on a side of the first terminal. The right side of FIG. 11 is a schematic diagram of viewing statistics about received red envelopes by the image publisher on the side of the first terminal. FIG. 12 to FIG. 17 are schematic diagrams of a user interface displayed on an application interface of the first terminal. FIG. 12 is a schematic diagram of viewing the second image by an image receiver on a side of a second terminal. The image is actually a second image obtained after obtained after the any first image uploaded by a user is encrypted. The second image is covered by an image layer of a mask type, which may certainly be an image that is not of a mask type and that is obtained by means of another masking policy (as shown in FIG. 12, an image covered by an image layer is a final presentation result formed by a mask; the mask refers to a layer of ground glass covered on a clear image, and the layer of ground glass is referred to as an "image mask"). FIG. 13 is a schematic diagram of prompting a friend to send a red envelope to view a photo. FIG. 14 is a schematic diagram of viewing a clear image under an image layer by means of matting. FIG. 15 is a schematic diagram of sending a red envelope. FIG. 16 is a schematic diagram of viewing an image for free by means of winning a lottery. FIG. 17 is a schematic diagram of displaying envelopes sent by friends in moments.

Figure 18:
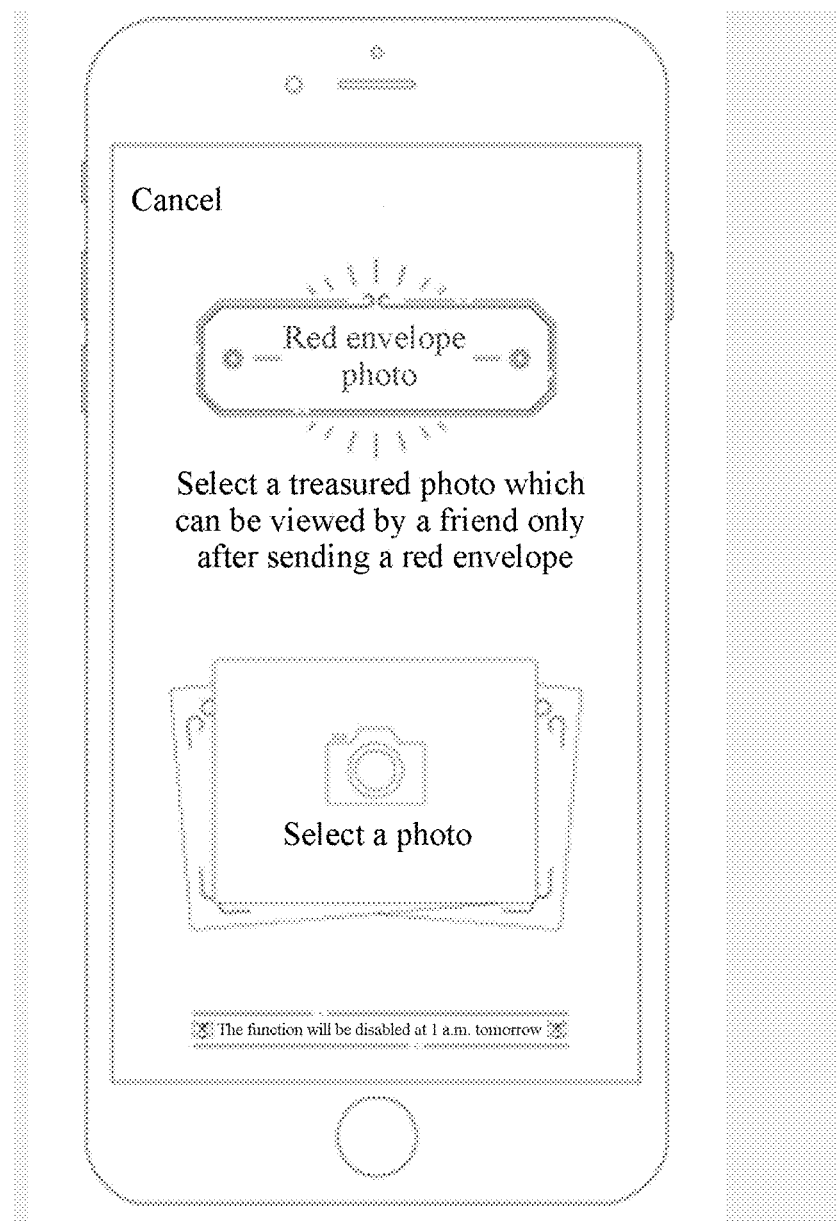
Figure 19:
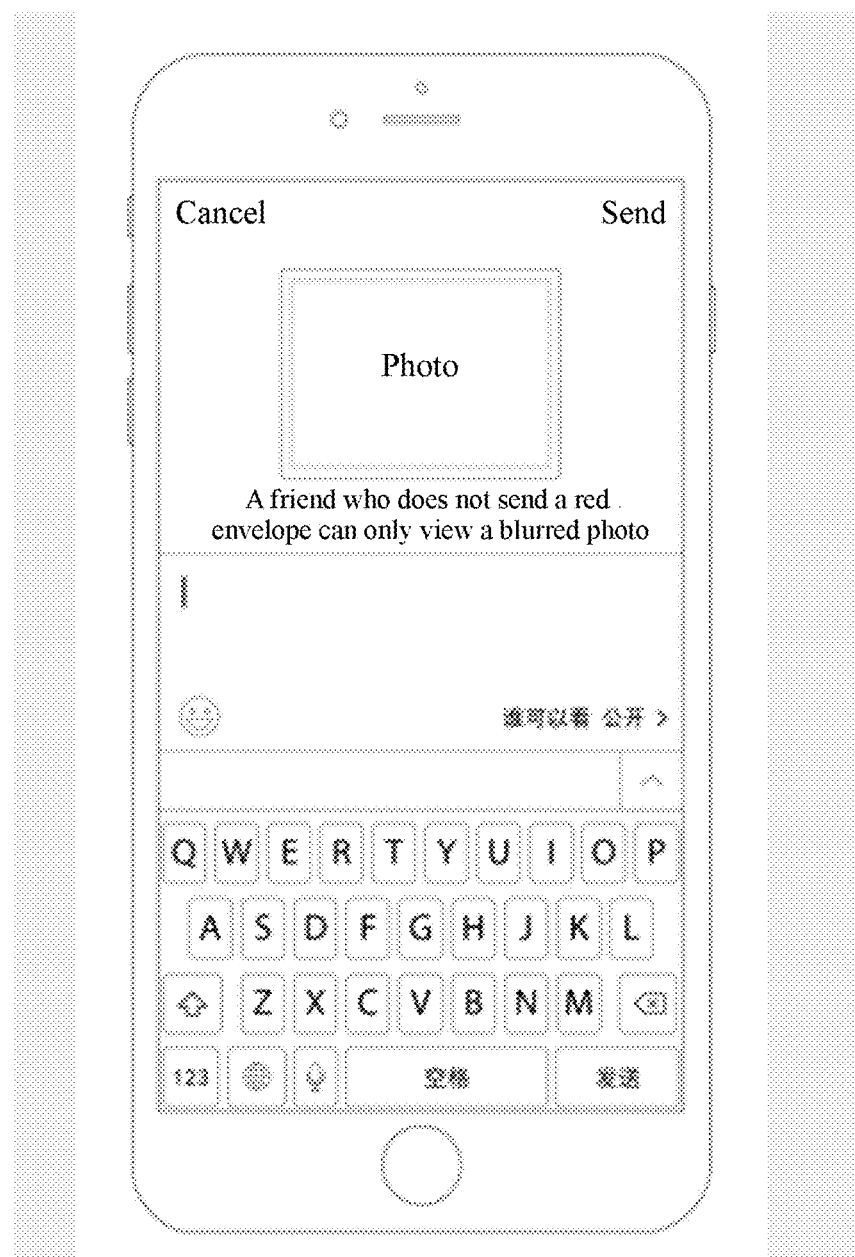
Figure 20:
Figure 21:
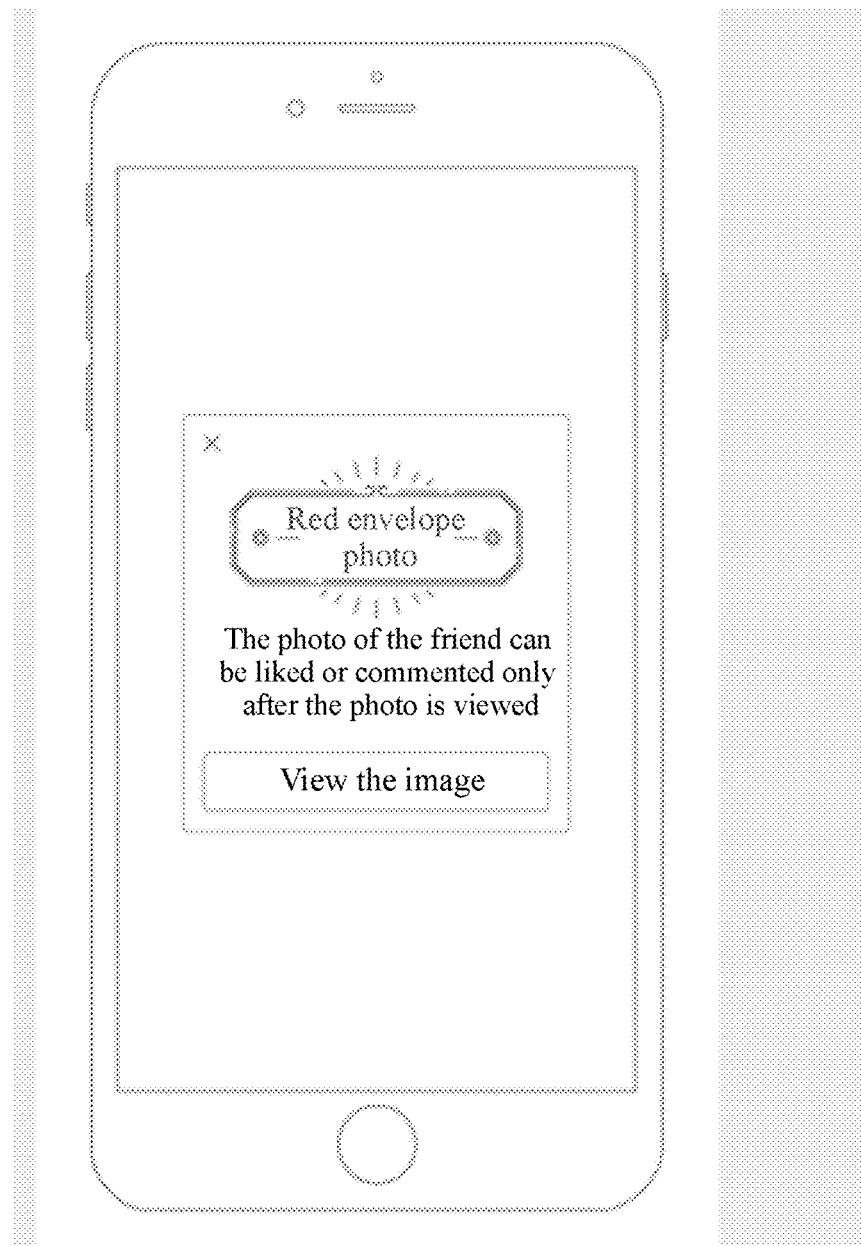

Through FIG. 18 to FIG. 21, a specific implementation process including a series of content such as how to send a red envelope photo, how to receive a red envelope photo, and removing a masking effect with reference to a process of encrypting and decrypting a photo is simply described according to the implementations of the present disclosure. The implementation process includes: selecting a first image on an information sending interface of the application, uploading the first image, and uploading any first image (as shown in FIG. 18); after uploading the any first image, inputting text information corresponding to the image (as shown in FIG. 19), and generating a first request according to the first image and the text information; sending the first request to a server, to request the server to perform encryption processing on the first image in the first request, so that a second image obtained after the encryption processing is displayed on an information presentation interface of an application running on a second terminal; the second image being a presentation form that is of covering an image layer on an image and that is rendered by means of a masking policy, the presentation form being different from a clear presentation form of another image on the information presentation interface of the application; obtaining, when viewing the image by using an image preview mode, at least one touch operation performed on different regions of the second image, and performing local demasking processing according to a preset policy, to obtain at least one piece of key information corresponding to the different regions of the image (as shown in FIG. 20); when it is determined, according to the at least one piece of key information, that an information form that is used for correspondingly decrypting the second image needs to be returned to the second terminal, sending a second request to the server according to a prompt described in FIG. 21 and indicating that a red envelope needs to be sent to view an original image; receiving second prompt information indicating that the image needs to be viewed by means of a payment behavior; obtaining a payment behavior generated by responding to the second prompt information, generating a third request according to the payment behavior, and sending the third request to the server, to request to perform decryption processing on the second image; and generating payment information according to the payment behavior, the second terminal instructing the server to send the payment information to a first terminal; or viewing the image by means of a payment-free behavior such as winning a lottery.

The technical solution is put forward for a condition that during actual application, when a user performs information exchange based on a social application (for example, a WeChat application), in a scenario in which a "red envelope photo" is published in moments, each time the user enters an image preview mode to view an image, the user can view a partial clear image through ground glass covered on a clear image. A clear part displayed each time when an image preview mode is entered is random. However, due to excessive randomness, the user does not know whether it is necessary to provide feedback. Because the clear part displayed each time when the image preview mode is entered is random, a meaningless part of an image is inevitably displayed. As a result, a requirement of the user for previewing an image and providing feedback for the image is reduced. According to the implementations of the present disclosure, in the scenario of the "red envelope photo", because of the function of publishing a "red envelope photo" newly added in moments, the user can only see a blurred thumbnail and a blurred image, and can see a partial clear image each time when an image preview mode is entered. Such a design is intended to enhance the impulse of the user to click to preview an image, and even to preview an image for multiple times, thereby achieving a substantial quantity of advertisement exposures on an image preview interface. A specific implementation is: an important information region of an image is anchored by using a face recognition interface provided by a system, and a probability of displaying meaningless content is reduced by means of policy distribution. To strategically display informative content of the image, the most informative region of the image is anchored by using the face recognition interface provided by the system, and the policy is displayed by means of a design. This can not only improve a click rate of an image previewed by users but also prevent image information of an image publisher from being completely displayed, without affecting positivity of the image publisher.

A specific implementation of the policy is: 1. An important information region of an image is anchored by using a face recognition interface provided by a system. 2. A display policy developed after the important information region of the image is anchored includes: (1) When there is no face in the image or a quantity of faces in the image is greater than or equal to 5, the key information is randomly displayed according to the display policy. (2) When there is a face in the image or a quantity of faces in the image is less than or equal to 5, a face is first selected randomly, a region M accounting for 60% of a lower part of the face is circled; a probability of displaying the region M is 10%, a probability of displaying a circumstance of the face is 40%, and a probability of displaying content of the image is 50%. 3. The display region is a circle, and a minimum radius and a maximum radius are controlled.

The specific implementation is applied to interaction for a publishing type of a "red envelope photo" in moments. Each time entering an image preview mode, a WeChat friend of a publisher can view a partial clear image. Therefore, the following two targets are achieved: (1) the impulse of the user to click to preview an image, and even to preview an image for multiple times is enhanced, thereby achieving a substantial quantity of advertisement exposures on an image preview interface. (2) Important information of image content of a "red envelope photo" publisher is prevented from being completely displayed, without affecting positivity of the publisher.

Beneficial effects of the masking technology in the implementations of the present disclosure are as follows: A "red envelope photo" scenario in moments bears an important advertisement exposure task; the impulse of the user to click to preview an image, and even to preview an image for multiple times is enhanced, thereby achieving a substantial quantity of advertisement exposures on an image preview interface; and important information of image content of a "red envelope photo" publisher is prevented from being completely displayed, without affecting positivity of the publisher.

In the several implementations provided in this application, it should be understood that the disclosed device and method may be implemented in other manners. The described device implementation is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between the components may be implemented by using some interfaces. The indirect couplings or communication connections between the devices or units may be implemented in electronic, mechanical, or other forms.

The units described as separate parts may or may not be physically separate, and the parts displayed as units may or may not be physical units, that is, may be located in one position, or may be distributed on a plurality of network units. Some or all of the units may be selected to achieve the objectives of the solutions of the implementations according to actual needs.

In addition, the functional units in the implementations of the present disclosure may be integrated into one processing unit, or each of the units may exist alone physically, or two or more units may be integrated into one unit. The integrated units may be implemented in a form of hardware, or may be implemented in a form of a software functional unit.

Persons of ordinary skill in the art may understand that some or all of the operations in the method implementations may be implemented by a program instructing relevant hardware. The program may be stored in a computer readable storage medium. When the program is executed, the operations in the method implementations are performed. The storage medium may be any medium that is capable of storing program code, such as a portable storage device, a read-only memory (ROM, Read-Only Memory), a random access memory (RAM, Random Access Memory), a magnetic disk, or an optical disk.

Alternatively, when the integrated unit in the present disclosure is implemented in the form of the software functional module and sold or used as a separate product, the integrated unit may be stored in a computer readable storage medium. Based on such an understanding, the technical solutions of the implementations of the present disclosure essentially, or the part contributing to the prior art may be implemented in a form of a software product. The computer software product is stored in a storage medium and includes several instructions for instructing a computer device (which may be a personal computer, a server, a network device, or the like) to perform all or some of the operations of the methods described in the implementations of the present disclosure. The storage medium may be any medium that is capable of storing program code, such as a portable storage device, a ROM, a RAM, a magnetic disk, or an optical disk.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

According to the implementations of the present disclosure, a first image on an information sending interface of the application is selected, the first image is uploaded, and a first request is generated according to the first image; the first request is sent to a server, to request the server to perform encryption processing on the first image in the first request, so that a second image obtained after the encryption processing is displayed on an information presentation interface of an application running on a second terminal; and payment information returned by the second terminal is received, the payment information being generated by the second terminal by responding to information on the information presentation interface. According to the implementations of the present disclosure, in addition to comment information generated by comments, information in other forms may further be added. Information in more forms and the initially sent information are integrated to facilitate information exchange between users in a social group. Moreover, corresponding to an encryption requirement for a part of information, an encryption mechanism and a corresponding decryption mechanism are specified. Therefore, a requirement for selectively opening and displaying this part of encryption information to some users is satisfied according to the encryption mechanism and the corresponding decryption mechanism, and users can respond to this part of encryption information and feedback an information form that can be used for correspondingly decrypting the information. In this way, decrypted information can be clearly displayed on a user interface of a social application.

What is claimed is:

1. An information access control method performed at a computer server having one or more processors and memory storing one or more programs to be executed by the one or more processors, the method comprising:
   receiving an image sharing request from a first terminal, wherein the first terminal is associated with a first user account of a social networking application and the image sharing request includes a first image to be shared among a user group of the social networking application of which the first user account is a member;
   encrypting the first image using an encryption key to obtain a second image that is an encrypted version of the first image;
   sending a preview version of the first image to a second terminal, wherein the second terminal is associated with a second user account of the social networking application that is also a member of the user group;
   receiving an image viewing request from the second terminal, wherein the image viewing request is generated by the second terminal in response to a user selection of the preview version of the first image at the second terminal and a user-initiated resource transfer from the second user account to the first user account; and
   returning the second image and a decryption key to the second terminal, wherein the second terminal is configured to restore the first image from the second image using the decryption key.

2. The method according to claim 1, wherein the image sharing request from the first terminal further includes a text message and the text message is sent to the second terminal along with the preview version of the first image.

3. The method according to claim 1, wherein the preview version of the first image is one selected from the group consisting of a low-resolution version of the first image, a randomly selected portion of the first image at its original resolution, and a combination of both.

4. The method according to claim 1, wherein the encryption key is the same as the decryption key.

5. The method according to claim 1, wherein the restored first image has an associated expiration timestamp after which the restored first image is replaced by the preview version of the first image at the second terminal.

6. The method according to claim 5, wherein the expiration timestamp of the restored first image is dependent upon the user-initiated resource transfer from the second user account to the first user account.

7. The method according to claim 1, wherein the first image is stored at an original storage address of a second server that is distinct from the computer server, the method further comprising:
   encrypting the original storage address according to a predetermined encryption and decryption policy to obtain an encrypted storage address;
   in response to the image viewing request from the second terminal, returning the encrypted storage address and the decryption key to the second terminal, wherein the second terminal is configured to submit the encrypted storage address of the first image to the second server, and the second server is then configured to recover the original storage address by decrypting the encrypted storage address according to the predetermined encryption and decryption policy, encrypt the first image stored at the recovered storage address using the encryption key and return the encrypted first image to the second terminal.

8. A computer server, comprising:
   one or more processors;
   memory; and
   one or more programs stored in the memory, wherein the one or more programs, when executed by the one or more processors, cause the computer server to perform a plurality of operations including:
   receiving an image sharing request from a first terminal, wherein the first terminal is associated with a first user account of a social networking application and the image sharing request includes a first image to be shared among a user group of the social networking application of which the first user account is a member;

encrypting the first image using an encryption key to obtain a second image that is an encrypted version of the first image;

sending a preview version of the first image to a second terminal, wherein the second terminal is associated with a second user account of the social networking application that is also a member of the user group;

receiving an image viewing request from the second terminal, wherein the image viewing request is generated by the second terminal in response to a user selection of the preview version of the first image at the second terminal and a user-initiated resource transfer from the second user account to the first user account; and returning the second image and a decryption key to the second terminal, wherein the second terminal is configured to restore the first image from the second image using the decryption key.

9. The computer server according to claim 8, wherein the image sharing request from the first terminal further includes a text message and the text message is sent to the second terminal along with the preview version of the first image.

10. The computer server according to claim 8, wherein the preview version of the first image is one selected from the group consisting of a low-resolution version of the first image, a randomly selected portion of the first image at its original resolution, and a combination of both.

11. The computer server according to claim 8, wherein the encryption key is the same as the decryption key.

12. The computer server according to claim 8, wherein the restored first image has an associated expiration timestamp after which the restored first image is replaced by the preview version of the first image at the second terminal.

13. The computer server according to claim 12, wherein the expiration timestamp of the restored first image is dependent upon the user-initiated resource transfer from the second user account to the first user account.

14. The computer server according to claim 8, wherein the first image is stored at an original storage address of a second server that is distinct from the computer server, and the plurality of operations further include:

encrypting the original storage address according to a predetermined encryption and decryption policy to obtain an encrypted storage address;

in response to the image viewing request from the second terminal, returning the encrypted storage address and the decryption key to the second terminal, wherein the second terminal is configured to submit the encrypted storage address of the first image to the second server, and the second server is then configured to recover the original storage address by decrypting the encrypted storage address according to the predetermined encryption and decryption policy, encrypt the first image stored at the recovered storage address using the encryption key and return the encrypted first image to the second terminal.

15. A non-transitory computer readable storage medium storing a plurality of computer executable operations, wherein the plurality of computer executable operations, when executed by one or more processors of a computer server, cause the computer server to perform a plurality of operations including:

receiving an image sharing request from a first terminal, wherein the first terminal is associated with a first user account of a social networking application and the image sharing request includes a first image to be shared among a user group of the social networking application of which the first user account is a member;

encrypting the first image using an encryption key to obtain a second image that is an encrypted version of the first image;

sending a preview version of the first image to a second terminal, wherein the second terminal is associated with a second user account of the social networking application that is also a member of the user group;

receiving an image viewing request from the second terminal, wherein the image viewing request is generated by the second terminal in response to a user selection of the preview version of the first image at the second terminal and a user-initiated resource transfer from the second user account to the first user account; and returning the second image and a decryption key to the second terminal, wherein the second terminal is configured to restore the first image from the second image using the decryption key.

16. The non-transitory computer readable storage medium according to claim 15, wherein the image sharing request from the first terminal further includes a text message and the text message is sent to the second terminal along with the preview version of the first image.

17. The non-transitory computer readable storage medium according to claim 15, wherein the preview version of the first image is one selected from the group consisting of a low-resolution version of the first image, a randomly selected portion of the first image at its original resolution, and a combination of both.

18. The non-transitory computer readable storage medium according to claim 15, wherein the encryption key is the same as the decryption key.

19. The non-transitory computer readable storage medium according to claim 15, wherein the restored first image has an associated expiration timestamp after which the restored first image is replaced by the preview version of the first image at the second terminal.

20. The non-transitory computer readable storage medium according to claim 19, wherein the expiration timestamp of the restored first image is dependent upon the user-initiated resource transfer from the second user account to the first user account.

* * * * *